(12) United States Patent
Narla et al.

(10) Patent No.: US 12,224,594 B2
(45) Date of Patent: Feb. 11, 2025

(54) PORTABLE ENERGY SYSTEM WITH AC INPUT

(71) Applicant: Enphase Energy, Inc., Petaluma, CA (US)

(72) Inventors: Sandeep Narla, Round Rock, TX (US); Patrick Lyle Chapman, Austin, TX (US); Sambit Satpathy, Haryana (IN)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 18/227,129

(22) Filed: Jul. 27, 2023

(65) Prior Publication Data

US 2024/0039296 A1    Feb. 1, 2024

Related U.S. Application Data

(60) Provisional application No. 63/393,655, filed on Jul. 29, 2022.

(51) Int. Cl.
*H02J 4/00*    (2006.01)
(52) U.S. Cl.
CPC ...................... *H02J 4/00* (2013.01)
(58) Field of Classification Search
CPC ........................................ H02J 4/00

USPC ............................................. 307/22
See application file for complete search history.

(56) References Cited

U.S. PATENT DOCUMENTS

| | | | |
|---|---|---|---|
| 9,559,521 B1 * | 1/2017 | King | H02J 9/06 |
| 2009/0296442 A1 | 12/2009 | Chang et al. | |
| 2015/0015075 A1 | 1/2015 | Toya et al. | |
| 2015/0171632 A1 | 6/2015 | Fry et al. | |
| 2017/0194811 A1 * | 7/2017 | Chan | H02J 7/007194 |

FOREIGN PATENT DOCUMENTS

| | | |
|---|---|---|
| KR | 10-1144936 B1 | 5/2012 |
| KR | 10-1197243 B1 | 11/2012 |

OTHER PUBLICATIONS

PCT International Search Report and Written Opinion for Application No. PCT/US2023/028823 dated Nov. 15, 2023, 10 pgs.

* cited by examiner

*Primary Examiner* — Joseph Chang
(74) *Attorney, Agent, or Firm* — Moser Taboada

(57) ABSTRACT

A portable energy system is provided herein and comprises a plurality of microinverters and an AC input and an AC output configured to connect to at least one of an AC input of another portable energy system or to a component of an energy management system.

18 Claims, 3 Drawing Sheets

PORTABLE ENERGY SYSTEM WITH AC INPUT

CROSS-REFERENCE TO RELATED APPLICATIONS

This application claims the benefit of and priority to U.S. Provisional Application Ser. No. 63/393,655, filed on Jul. 29, 2022, the entire contents of which is incorporated herein by reference.

BACKGROUND

1. Field of the Disclosure

Embodiments of the present disclosure generally relate to portable energy systems, and more particularly, to portable energy systems with AC input.

2. Description of the Related Art

Conventional portable energy systems, typically, use DC storage with an AC power converter on an input of a power cord of the portable energy system. However, because the AC input is converted via an independent power converter (e.g., an enclosure integrated on the power cord), the options for using the output DC are limited.

SUMMARY

In accordance with some aspects of the present disclosure there is provided a portable energy system comprising a plurality of microinverters and an AC input and an AC output configured to connect to at least one of an AC input of another portable energy system or to a component of an energy management system.

In accordance with some aspects of the present disclosure there is provided an energy management system comprising at least one of AC battery system, a power converter, a DC power source, a microinverter, a grid, or a load and a portable energy system, comprising a plurality of microinverters; and an AC input and an AC output configured to connect to at least one of an AC input of another portable energy system or to a component of the energy management system.

Various advantages, aspects, and novel features of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only a typical embodiment of this disclosure and are therefore not to be considered limiting of its scope, for the disclosure may admit to other equally effective embodiments.

DETAILED DESCRIPTION

In accordance with the present disclosure, portable energy systems are disclosed herein. For example, the portable energy system can comprise a plurality of microinverters and an AC input and an AC output configured to connect to at least one of an AC input of another portable energy system or to a component of an energy management system. The portable energy systems described herein provide a true AC input, which allows the portable energy systems to run loads while charging and allows AC expansion with synced waveforms across cascaded units (power energy systems that are connected to each other).

Figure 1:
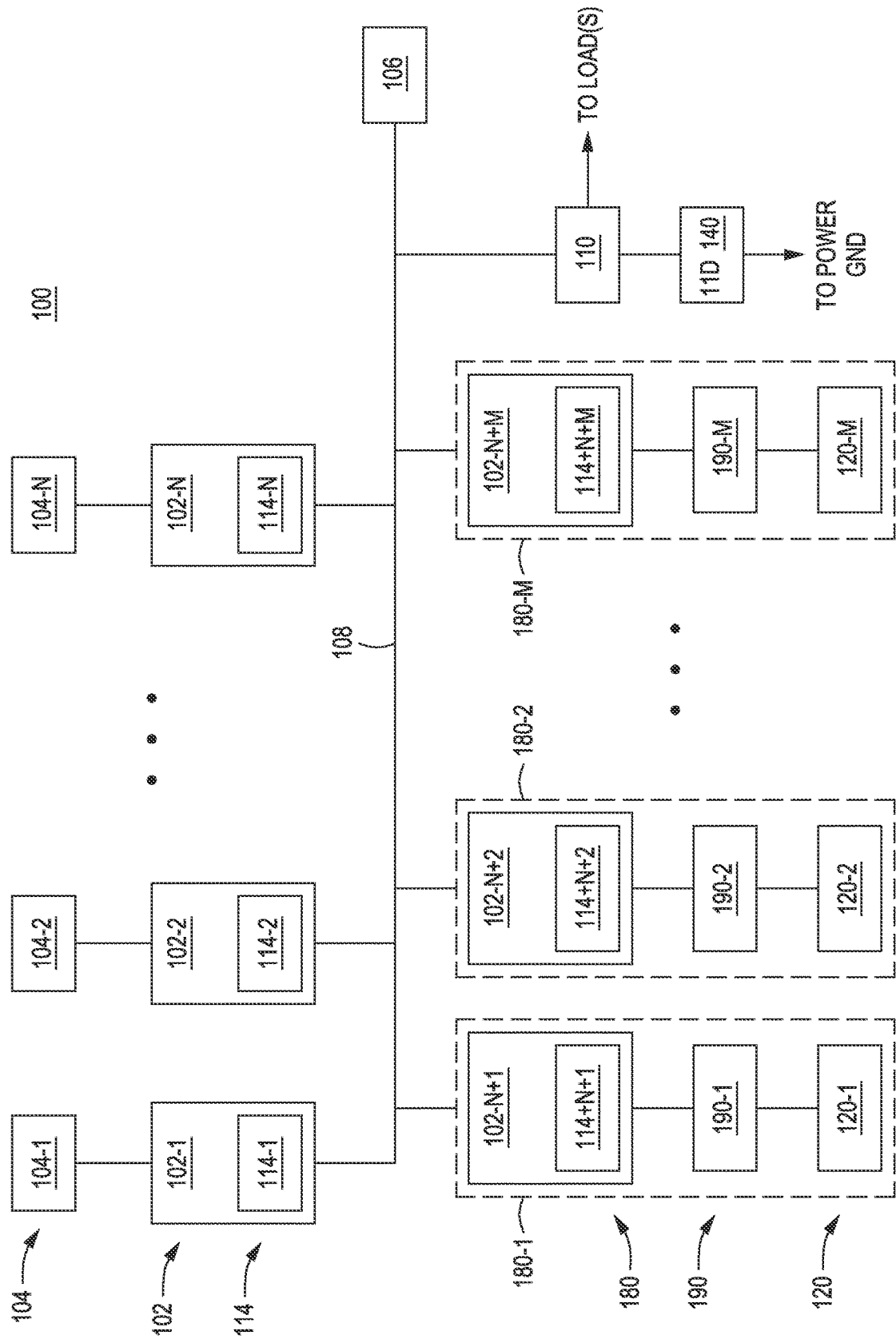
FIG. 1 is a block diagram of a system for power conversion, in accordance with at least some embodiments of the present disclosure.

FIG. 1 is a block diagram of a system 100 (energy management system) for power conversion using one or more embodiments of the present disclosure. This diagram only portrays one variation of the myriad of possible system configurations and devices that may utilize the present disclosure.

The system 100 is a microgrid that can operate in both an islanded state and in a grid-connected state (i.e., when connected to another power grid (such as one or more other microgrids and/or a commercial power grid). The system 100 comprises a plurality of corresponding power converters 102-1, 102-2, ... 102-N, 102-N+1, and 102-N+M collectively referred to as power converters 102 (which also may be called power conditioners); a plurality of DC power sources 104-1, 104-2, ... 104-N, collectively referred to as power sources 104; a plurality of energy storage devices/delivery devices 120-1, 120-2, ... 120-M collectively referred to as energy storage/delivery devices 120; a system controller 106; a plurality of BMUs 190-1, 190-2, ... 190-M collectively referred to as BMUs 190 (battery management units); a system controller 106; a bus 108; a load center 110; and an IID 140 (island interconnect device) (which may also be referred to as a microgrid interconnect device (MID)). In some embodiments, such as the embodiments described herein, the energy storage/delivery devices are rechargeable batteries (e.g., multi-C-rate collection of AC batteries) which may be referred to as batteries 120, although in other embodiments the energy storage/delivery devices may be any other suitable device for storing energy and providing the stored energy. Generally, each of the batteries 120 comprises a plurality cells that are coupled in series, e.g., eight cells coupled in series to form a battery 120.

Each of the corresponding power converter 102-1, 102-2 ... 102-N is coupled to a DC power source 104-1, 104-2 ... 104-N, respectively, in a one-to-one correspondence, although in some other embodiments multiple DC power sources may be coupled to one or more of the power converters 102. The power converters 102-N+1, 102-N+2 ... 102-N+M are respectively coupled to plurality of energy storage devices/delivery devices 120-1, 120-2 ... 120-M via BMUs 190-1, 190-2 ... 190-M to form AC batteries 180-1, 180-2 ... 180-M, respectively. Each of the corresponding power converters 102-1, 102-2 ... 102-N+M comprises a corresponding controller 114-1, 114-2 ... 114-N+M (collectively referred to as the inverter controllers 114) for controlling operation of the corresponding power converters 102-1, 102-2 . . . 102-N+M.

In some embodiments, such as the embodiment described below, the DC power sources 104 are DC power sources and the power converters 102 are bidirectional inverters such that the corresponding power converters 102-1 . . . 102-N convert DC power from the DC power sources 104 to grid-compliant AC power that is coupled to the bus 108, and the power converters 102-N+1 . . . 102-N+M convert (during energy storage device discharge) DC power from the batteries 120 to grid-compliant AC power that is coupled to the bus 108 and also convert (during energy storage device charging) AC power from the bus 108 to DC output that is stored in the batteries 120 for subsequent use. The DC power sources 104 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power. In other embodiments the power converters 102 may be other types of converters (such as DC-DC converters), and the bus 108 is a DC power bus.

The power converters 102 are coupled to the system controller 106 via the bus 108 (which also may be referred to as an AC line or a grid). The system controller 106 generally comprises a CPU coupled to each of support circuits and a memory that comprises a system control module for controlling some operational aspects of the system 100 and/or monitoring the system 100 (e.g., issuing certain command and control instructions to one or more of the power converters 102, collecting data related to the performance of the power converters 102, and the like). The system controller 106 is capable of communicating with the power converters 102 by wireless and/or wired communication (e.g., power line communication) for providing certain operative control and/or monitoring of the power converters 102.

In some embodiments, the system controller 106 may be a gateway that receives data (e.g., performance data) from the power converters 102 and communicates (e.g., via the Internet) the data and/or other information to a remote device or system, such as a master controller (not shown). Additionally or alternatively, the gateway may receive information from a remote device or system (not shown) and may communicate the information to the power converters 102 and/or use the information to generate control commands that are issued to the power converters 102.

The power converters 102 are coupled to the load center 110 via the bus 108, and the load center 110 is coupled to the power grid via the IID 140. When coupled to the power grid (e.g., a commercial grid or a larger microgrid) via the IID 140, the system 100 may be referred to as grid-connected; when disconnected from the power grid via the IID 140, the system 100 may be referred to as islanded. The IID 140 determines when to disconnect from/connect to the power grid (e.g., the IID 140 may detect a grid fluctuation, disturbance, outage or the like) and performs the disconnection/connection. Once disconnected from the power grid, the system 100 can continue to generate power as an intentional island, without imposing safety risks on any line workers that may be working on the grid, using the droop control techniques described herein. The IID 140 comprises a disconnect component (e.g., a disconnect relay) for physically disconnecting/connecting the system 100 from/to the power grid. In some embodiments, the IID 140 may additionally comprise an autoformer for coupling the system 100 to a split-phase load that may have a misbalance in it with some neutral current. In certain embodiments, the system controller 106 comprises the IID 140 or a portion of the IID 140.

The power converters 102 convert the DC power from the DC power sources 104 and discharging batteries 120 to grid-compliant AC power and couple the generated output power to the load center 110 via the bus 108. The power is then distributed to one or more loads (for example to one or more appliances) and/or to the power grid (when connected to the power grid). Additionally or alternatively, the generated energy may be stored for later use, for example using batteries, heated water, hydro pumping, $H_2O$-to-hydrogen conversion, or the like. Generally, the system 100 is coupled to the commercial power grid, although in some embodiments the system 100 is completely separate from the commercial grid and operates as an independent microgrid.

In some embodiments, the AC power generated by the power converters 102 is single-phase AC power. In other embodiments, the power converters 102 generate three-phase AC power.

Figure 2:
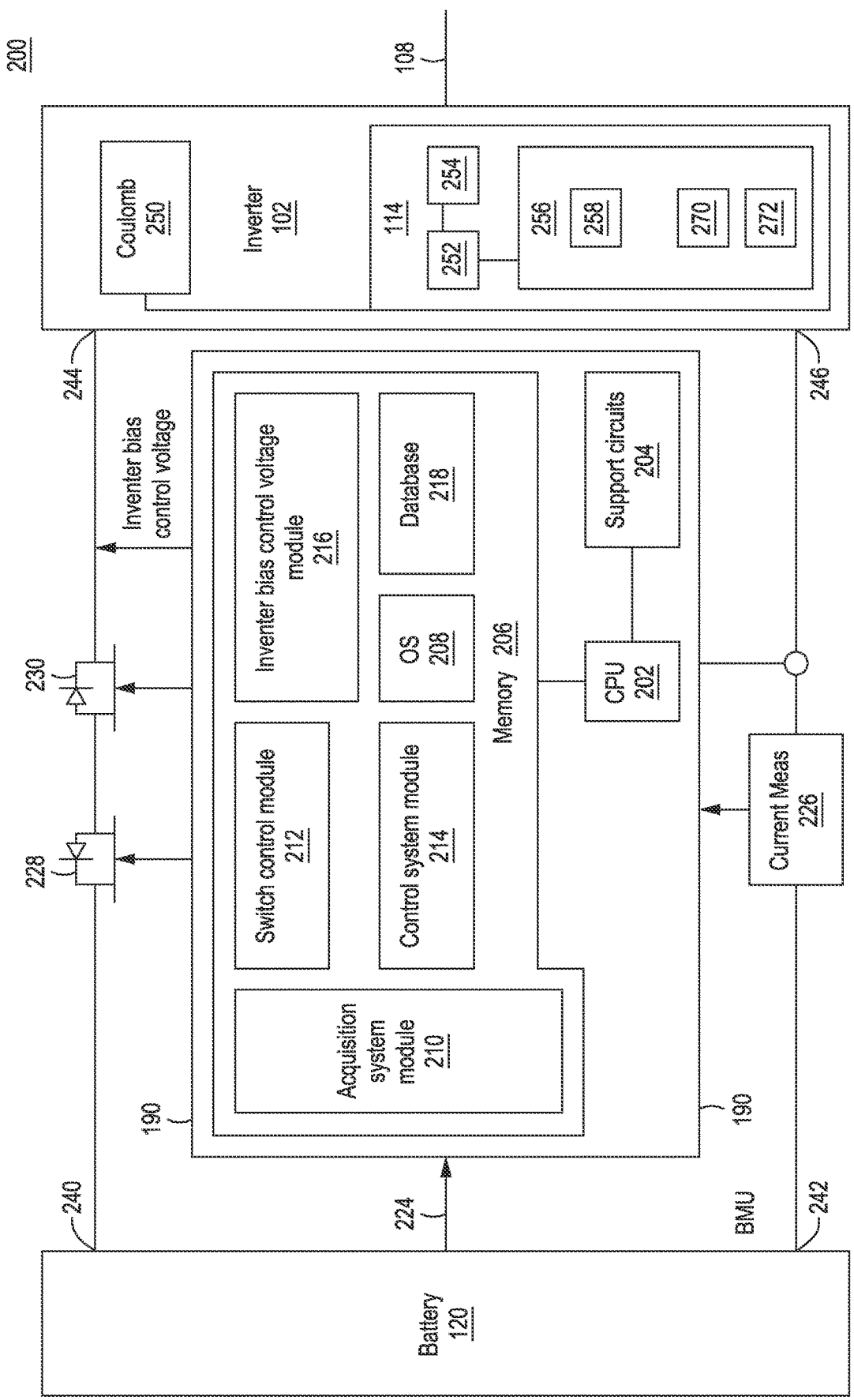
FIG. 2 is a block diagram of an AC battery system configured for use with the portable energy system of FIG. 1, in accordance with at least some embodiments of the present disclosure.

A storage system configured for use with an energy management system, such as the ENSEMBLE® energy management system available from ENPHASE®, is described herein. For example, FIG. 2 is a block diagram of an AC battery system 200 (e.g., a storage system) in accordance with one or more embodiments of the present disclosure.

The AC battery system 200 comprises a BMU 190 coupled to a battery 120 and a power converter 102. A pair of metal-oxide-semiconductor field-effect transistors (MOSFETs) switches—switches 228 and 230—are coupled in series between a first terminal 240 of the battery 120 and a first terminal of the inverter 144 such the body diode cathode terminal of the switch 228 is coupled to the first terminal 240 of the battery 120 and the body diode cathode terminal of the switch 230 is coupled to the first terminal 244 of the power converter 102. The gate terminals of the switches 228 and 230 are coupled to the BMU 190.

A second terminal 242 of the battery 120 is coupled to a second terminal 246 of the power converter 102 via a current measurement module 226 which measures the current flowing between the battery 120 and the power converter 102.

The BMU 190 is coupled to the current measurement module 226 for receiving information on the measured current, and also receives an input 224 from the battery 120 indicating the battery cell voltage and temperature. The BMU 190 is coupled to the gate terminals of each of the switches 228 and 230 for driving the switch 228 to control battery discharge and driving the switch 230 to control battery charge as described herein. The BMU 190 is also coupled across the first terminal 244 and the second terminal 246 for providing an inverter bias control voltage (which may also be referred to as a bias control voltage) to the inverter 102 as described further below.

The configuration of the body diodes of the switches 228 and 230 allows current to be blocked in one direction but not the other depending on state of each of the switches 228 and 230. When the switch 228 is active (i.e., on) while the switch 230 is inactive (i.e., off), battery discharge is enabled to allow current to flow from the battery 120 to the power converter 102 through the body diode of the switch 230. When the switch 228 is inactive while the switch 230 is active, battery charge is enabled to allow current flow from the power converter 102 to the battery 120 through the body diode of the switch 228. When both switches 228 and 230 are active, the system is in a normal mode where the battery 120 can be charged or discharged.

The BMU 190 comprises support circuits 204 and a memory 206 (e.g., non-transitory computer readable storage medium), each coupled to a CPU 202 (central processing unit). The CPU 202 may comprise one or more processors, microprocessors, microcontrollers and combinations thereof configured to execute non-transient software instructions to perform various tasks in accordance with embodiments of the present disclosure. The CPU 202 may additionally or alternatively include one or more application specific integrated circuits (ASICs). In some embodiments, the CPU 202 may be a microcontroller comprising internal memory for storing controller firmware that, when executed, provides the controller functionality described herein. The BMU 190 may be implemented using a general purpose computer that, when executing particular software, becomes a specific purpose computer for performing various embodiments of the present disclosure.

The support circuits 204 are well known circuits used to promote functionality of the CPU 202. Such circuits include, but are not limited to, a cache, power supplies, clock circuits, buses, input/output (I/O) circuits, and the like. The BMU 190 may be implemented using a general purpose computer that, when executing particular software, becomes a specific purpose computer for performing various embodiments of the present disclosure. In one or more embodiments, the CPU 202 may be a microcontroller comprising internal memory for storing controller firmware that, when executed, provides the controller functionality described herein.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the OS 208 (operating system), if necessary, of the inverter controller 114 that can be supported by the CPU capabilities. In some embodiments, the OS 208 may be one of a number of commercially available operating systems such as, but not limited to, LINUX, Real-Time Operating System (RTOS), and the like.

The memory 206 stores non-transient processor-executable instructions and/or data that may be executed by and/or used by the CPU 202 to perform, for example, one or more methods for discharge protection, as described in greater detail below. These processor-executable instructions may comprise firmware, software, and the like, or some combination thereof. The memory 206 stores various forms of application software, such as an acquisition system module 210, a switch control module 212, a control system module 214, and an inverter bias control module 216. The memory 206 additionally stores a database 218 for storing data related to the operation of the BMU 190 and/or the present disclosure, such as one or more thresholds, equations, formulas, curves, and/or algorithms for the control techniques described herein. In various embodiments, one or more of the acquisition system module 210, the switch control module 212, the control system module 214, the inverter bias control module 216, and the database 218, or portions thereof, are implemented in software, firmware, hardware, or a combination thereof.

The acquisition system module 210 obtains the cell voltage and temperature information from the battery 120 via the input 224, obtains the current measurements provided by the current measurement module 226, and provides the cell voltage, cell temperature, and measured current information to the control system module 214 for use as described herein.

The switch control module 212 drives the switches 228 and 230 as determined by the control system module 214. The control system module 214 provides various battery management functions, including protection functions (e.g., overcurrent (OC) protection, overtemperature (OT) protection, and hardware fault protection), metrology functions (e.g., averaging measured battery cell voltage and battery current over, for example, 100 ms to reject 50 and 60 Hz ripple), state of charge (SOC) analysis (e.g., coulomb gauge 250 for determining current flow and utilizing the current flow in estimating the battery SOC; synchronizing estimated SOC values to battery voltages (such as setting SOC to an upper bound, such as 100%, at maximum battery voltage; setting SOC to a lower bound, such as 0%, at a minimum battery voltage); turning off SOC if the power converter 102 never drives the battery 120 to these limits; and the like), balancing (e.g., autonomously balancing the charge across all cells of a battery to be equal, which may be done at the end of charge, at the end of discharge, or in some embodiments both at the end of charge and the end of discharge). By establishing upper and lower estimated SOC bounds based on battery end of charge and end of discharge, respectively, and tracking the current flow and cell voltage (i.e., battery voltage) between these events, the BMU 190 determines the estimated SOC.

The inverter controller 114 comprises support circuits 254 and a memory 256, each coupled to a CPU 252 (central processing unit). The CPU 252 may comprise one or more processors, microprocessors, microcontrollers and combinations thereof configured to execute non-transient software instructions to perform various tasks in accordance with embodiments of the present disclosure. The CPU 252 may additionally or alternatively include one or more application specific integrated circuits (ASICs). In some embodiments, the CPU 252 may be a microcontroller comprising internal memory for storing controller firmware that, when executed, provides the controller functionality herein. The inverter controller 114 may be implemented using a general purpose computer that, when executing particular software, becomes a specific purpose computer for performing various embodiments of the present disclosure.

The support circuits 254 are well known circuits used to promote functionality of the CPU 252. Such circuits include, but are not limited to, a cache, power supplies, clock circuits, buses, input/output (I/O) circuits, and the like. The inverter controller 114 may be implemented using a general purpose computer that, when executing particular software, becomes a specific purpose computer for performing various embodiments of the present disclosure. In one or more embodiments, the CPU 252 may be a microcontroller comprising internal memory for storing controller firmware that, when executed, provides the controller functionality described herein.

The memory 256 may comprise random access memory, read only memory, removable disk memory, flash memory, and various combinations of these types of memory. The memory 256 is sometimes referred to as main memory and may, in part, be used as cache memory or buffer memory. The memory 256 generally stores the OS 258 (operating system), if necessary, of the inverter controller 114 that can be supported by the CPU capabilities. In some embodiments, the OS 258 may be one of a number of commercially available operating systems such as, but not limited to, LINUX, Real-Time Operating System (RTOS), and the like.

The memory 256 stores non-transient processor-executable instructions and/or data that may be executed by and/or used by the CPU 252. These processor-executable instructions may comprise firmware, software, and the like, or some combination thereof. The memory 256 stores various forms of application software, such as a power conversion control module 270 for controlling the bidirectional power conversion, and a battery management control module 272.

The BMU 190 communicates with the system controller 106 to perform balancing of the batteries 120 (e.g., multi-C-rate collection of AC batteries) based on a time remaining before each of the batteries are depleted of charge, to perform droop control (semi-passive) which allows the batteries to run out of charge at substantially the same time, and perform control of the batteries to charge batteries having less time remaining before depletion using batteries having more time remaining before depletion, as described in greater detail below.

Figure 3:
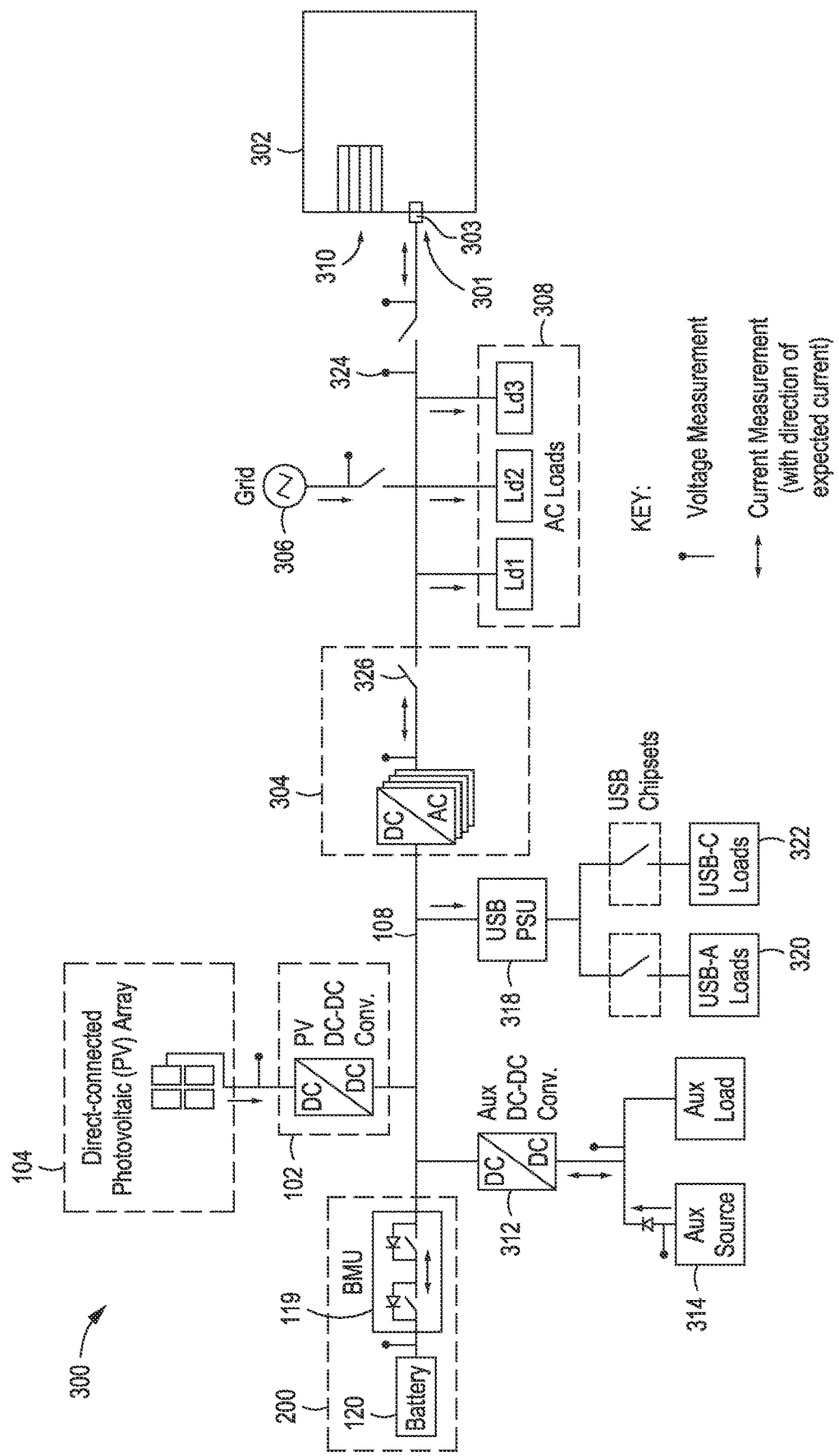
FIG. 3 is a block diagram of a system for power conversion configured for use with the portable energy system of FIG. 1, in accordance with at least some embodiments of the present disclosure.

FIG. 3 is a block diagram of a portable energy system 302 for power conversion configured for use with a system 300 of FIG. 1, in accordance with at least some embodiments of the present disclosure. The system 300 is substantially similar to the system 100. For example, the system 300 comprises the AC battery system 200, the power converters 102, a plurality of DC power sources 104, one or more microinverters 304, a power grid 306, and one or more loads 308 (e.g., loads Ld1-Ld3).

The portable energy system 302 comprises a plurality of microinverters 310. For example, the plurality of microinverters 310 (e.g., four microinverters shown) can comprise one or more microinverters configured for use with the ENSEMBLE® energy management system available from ENPHASE®. In at least some embodiments, for example, the plurality of microinverters 310 (e.g., microgrid forming microinverters) can be configured similarly to the microinverters described in commonly-owned U.S. patent application Ser. No. 17/145,793 and commonly-owned U.S. patent application Ser. No. 12/121,616, the entire contents of each of these applications is incorporated herein by reference. The plurality of microinverters 310 are configured to allow an AC input/output 301 of the portable energy system 302 to connect to at least one of an AC input of another portable energy system (e.g., another portable energy system 302, not shown) or to other AC loads. For example, in at least some embodiments, the portable energy system 302 can comprise one or more expansion ports 303 disposed adjacent to the AC input/output 301 and configured to connect the AC input/output 301 of the portable energy system 302 to the AC input of another portable energy system. In some embodiments, the AC output may serve loads directly, may be supplied to the grid, or may be integrated with other AC sources as part of a combined energy system. In at least some embodiments, connection cables or other suitable connection devices can be configured to connect to the one or more expansion ports 303 for connecting the portable energy system to any of the aforementioned devices.

In at least some embodiments, when the portable energy system 302 is connected to the AC input of another portable energy system, the plurality of microinverters 310 of the portable energy system 302 and a plurality of microinverters (not shown) of the another portable energy system can be phased-synced such that an output current from the another portable energy system (or from the portable energy system 302) is a sum of the portable energy system 302 and the another portable energy system. Compared to conventional portable energy storage systems, which when connected to each other merely increase total storage capacity of the portable energy storage systems, the portable energy systems 302—including the microinverters described herein, such as the microinverters described in U.S. patent application Ser. No. 12/121,616—when connected to each other, increase total output current.

Moreover, in at least some embodiments, when the portable energy system 302 is connected to the AC input of another portable energy system, the portable energy system 302 can be used to charge the another portable energy system, and vice versa. Similarly, when the portable energy system 302 is connected to the AC input of another portable energy system, the portable energy system 302 can be configured to provide power to a load connected to the another portable energy system. For example, if another portable energy system is connected to the load Ld1 (e.g., a refrigerator) and the another portable energy system's SoC is low, the portable energy system 302 can be connected to the another portable energy system and be used to provide power to the load while charging the another portable energy system. Likewise, when the portable energy system 302 is connected to the one or more microinverters 304, the portable energy system 302 can be configured to at least one of provide power to the load Ld2 and/or load Ld3 (e.g., a boiler and an air conditioner, respectively) connected to the one or more microinverters 304 or to charge the battery 120 of the AC battery system 200.

The portable energy system 302 can comprise one or more inverter controllers 114 and/or one or more other components of the AC battery system 200 described above. Additionally, the portable energy system 302 can be configured to communicate (e.g., via a wired and/or a wireless interface) with the system 100 and the system 300 and/or one or more components (e.g., the AC battery system 200, the power converters 102, the plurality of DC power sources 104, the one or more microinverters 304, the power grid 306, one or more loads 308) associated therewith. Similarly, the portable energy system 302 can communicatively couple to another portable energy system via wired and/or a wireless interface.

In at least some embodiments, the portable energy system 302 can be configured to connect to one or more of an auxiliary power converters 312 (e.g., a DC to DC power converter) that connect to one or more corresponding auxiliary sources 314 or auxiliary loads 316. In at least some embodiments, the portable energy system 302 can be configured to connect directly to the one or more corresponding auxiliary sources 314 or auxiliary loads 316, e.g., using the expansion ports 303 or other device suitable for connecting the portable energy system 302 to the one or more corresponding auxiliary sources 314 or auxiliary loads 316. Likewise, the portable energy system 302 can be configured to connect to one or more of a USB power supply unit 318 that connect to one or more corresponding USB loads 320, 322. In at least some embodiments, the portable energy system 302 can be configured to connect directly to the one or more corresponding USB loads 320, 322, e.g., using the expansion ports 303 or other device suitable for connecting the portable energy system 302 to the one or more corresponding USB loads 320, 322.

In at least some embodiments, one or more sensors 324 can be provided and configured to provide one or more voltage and current measurements from components associated with the system 100 and/or the system 300 to the portable energy system 302. For example, the one or more sensors 324 can be operably coupled to the bus 108 to measure voltage and current from components associated with the system 100 and/or the system 300. Similarly, one or more relays 326 and/or other devices coupled to the bus 108 may be provided to connect and/or disconnect the portable energy system 302 from the system 100 and the system 300 and/or the components associated therewith.

While the foregoing is directed to embodiments of the present disclosure, other and further embodiments of the disclosure may be devised without departing from the basic scope thereof, and the scope thereof is determined by the claims that follow.

The invention claimed is:

1. A portable energy system, comprising:
a plurality of microinverters; and
an AC input and an AC output configured to connect to at least one of an AC input of another portable energy system or to a component of an energy management system,
wherein the plurality of microinverters are configured to receive AC power via the AC input for charging the portable energy system and are configured to provide AC power via the AC output for charging the another portable energy system or powering the component of an energy management system.

2. The portable energy system of claim 1, further comprising an expansion port that is configured to connect to the at least one of the AC input of the another portable energy system or to the component of the energy management system.

3. The portable energy system of claim 2, wherein when the portable energy system is connected to the AC input of the another portable energy system, the plurality of microinverters of the portable energy system and a plurality of microinverters of the another portable energy system are phased-synced such that an output current from the another portable energy system is a sum of the portable energy system and the another portable energy system.

4. The portable energy system of claim 2, wherein when the portable energy system is connected to the AC input of the another portable energy system, at least one of the portable energy system or the another portable energy system is used to charge each other.

5. The portable energy system of claim 2, wherein when the portable energy system is connected to the AC input of the another portable energy system, the portable energy system is configured to provide power to a load connected to the another portable energy system.

6. The portable energy system of claim 5, wherein when the portable energy system is connected to the load connected to the another portable energy system, the portable energy system is configured to at least one of provide power to the load connected to the another portable energy system or to charge a battery of a storage system of the energy management system.

7. The portable energy system of claim 5, wherein the portable energy system is communicatively coupled to the another portable energy system or to the load connected to the another portable energy system over at least one of a wired or wireless interface.

8. The portable energy system of claim 1, wherein the portable energy system comprises at least one sensor that is configured to provide at least one of voltage or current measurements from components associated with the energy management system.

9. The portable energy system of claim 1, wherein the portable energy system comprises a relay that is configured connect and/or disconnect the portable energy system to/from the energy management system.

10. An energy management system, comprising:
at least one of AC battery system, a power converter, a DC power source, a microinverter, a grid, or a load; and
a portable energy system, comprising:
a plurality of microinverters; and
an AC input and an AC output configured to connect to at least one of an AC input of another portable energy system or to a component of an energy management system,
wherein the plurality of microinverters are configured to receive AC power via the AC input for charging the portable energy system and are configured to provide AC power via the AC output for charging the another portable energy system or powering the component of an energy management system.

11. The energy management system of claim 10, wherein the portable energy system further comprises an expansion port that is configured to connect to the at least one of the AC input of the another portable energy system or to the component of the energy management system.

12. The energy management system of claim 11, wherein when the portable energy system is connected to the AC input of the another portable energy system, the plurality of microinverters of the portable energy system and a plurality of microinverters of the another portable energy system are phased-synced such that an output current from the another portable energy system is a sum of the portable energy system and the another portable energy system.

13. The energy management system of claim 11, wherein when the portable energy system is connected to the AC input of the another portable energy system, at least one of the portable energy system or the another portable energy system is used to charge each other.

14. The energy management system of claim 11, wherein when the portable energy system is connected to the AC input of the another portable energy system, the portable energy system is configured to provide power to a load connected to the another portable energy system.

15. The energy management system of claim 11, wherein when the portable energy system is connected to the load connected to the another portable energy system, the portable energy system is configured to at least one of provide power to the load connected to the another portable energy system or to charge a battery of a storage system of the energy management system.

16. The energy management system of claim 11, wherein the portable energy system is communicatively coupled to the another portable energy system or to the load connected to the another portable energy system over at least one of a wired or wireless interface.

17. The energy management system of claim 10, wherein the portable energy system comprises at least one sensor that is configured to provide at least one of voltage or current measurements from components associated with the energy management system.

18. The portable energy system of claim 10, wherein the portable energy system comprises a relay that is configured connect and/or disconnect the portable energy system to/from the energy management system.

* * * * *